United States Patent [19]
McLeod

[11] 4,086,095
[45] Apr. 25, 1978

[54] COATING COMPOSITION

[75] Inventor: Gordon D. McLeod, Lenawee County, Mich.

[73] Assignee: Mobile Oil Corporation, New York, N.Y.

[21] Appl. No.: 542,837

[22] Filed: Jan. 21, 1975

Related U.S. Application Data

[63] and a continuation-in-part of Ser. No. 409,067, , and Ser. No. 284,099, , and Ser. No. 283,964, , and Ser. No. 107,578, , and Ser. No. 75,306, , said Ser. No. 409,067, and a continuation-in-part of Ser. No. 283,964, is a continuation-in-part of Ser. No. 107,578, Jan. 18, 1971, abandoned, which is a continuation-in-part of Ser. No. 75,306, Sep. 24, 1970, abandoned, said Ser. No. 284,099, is a continuation-in-part of Ser. No. 107,578, , and Ser. No. 75,306.

[51] Int. Cl.² .............................................. C09D 5/10
[52] U.S. Cl. ............................... 106/1.17; 106/14.34; 106/287.16
[58] Field of Search ........................ 106/14, 1, 287 SE

[56] References Cited

U.S. PATENT DOCUMENTS

| | | | |
|---|---|---|---|
| 2,450,327 | 9/1948 | Cogan | 106/287 SE |
| 3,056,684 | 10/1962 | Lopata et al. | 106/14 |
| 3,392,130 | 7/1968 | Rucker et al. | 106/14 |
| 3,489,709 | 1/1970 | Halsey | 260/33.4 |
| 3,615,730 | 10/1971 | Law | 106/14 |
| 3,730,746 | 5/1973 | Boaz | 106/14 |
| 3,804,639 | 4/1974 | Trulsson et al. | 106/14 |
| 3,859,101 | 1/1975 | Slater | 106/14 |

*Primary Examiner*—Lorenzo B. Hayes

*Attorney, Agent, or Firm*—Stevens, Davis, Miller & Mosher

[57] ABSTRACT

Improved zinc-containing coating compositions are useful to protect ferrous-containing surfaces. They are particularly useful and highly protective against red rust. The compositions with higher zinc content can be used as very thin coatings. Those having lower zinc content are used to provide preferably a thicker coating. The compositions contain: metallic zinc in particulate form, e.g., zinc dust or zinc flake; a polyol silicate; a chromate composition selected from strontium chromate, calcium chromate, barium chromate, lead chromate plus lead sulfate (chrome yellow & primrose) and a mixture of zinc chromate and zinc oxide or hydroxide; and a liquid organic vehicle. When zinc dust is used as the particulate zinc, finely divided inert extenders, such as iron phosphide, may be incorporated in the composition; in such composition the zinc content of the combination can be lower without impairing the protective action provided by a coating of the composition. The polyol silicate is a solvent-soluble polyol silicate ester-exchange reaction product of (1) an organic silicate consisting essentially of ortho or poly silicates having ester-exchangeable groups of 1 to 6 carbon atoms selected from the group consisting of alkyl, hydroxyalkyl, alkoxyalkyl, and hydroxyalkoxyalkyl, siloxanes thereof, and their mixtures, and (2) a polyol which is ester-exchangeable with (1). The composition containing zinc flake, polyol silicate and strontium chromate is a preferred composition as it can provide very highly protective rust-free thin coatings of 0.05 to 0.2-mil dry thickness, that offer the advantages of a preconstruction weld-thru coating having improved flexibility for forming operation processes.

16 Claims, No Drawings

COATING COMPOSITION

This patent application is a continuation-in-part of my patent applications Ser. Nos. 409,067, 284,099, 283,964, 107,578 and 75,306. Application Ser. No. 409,067, filed Oct. 24, 1973, now U.S. Pat. No. 3,932,339, is a continuation-in-part of application Ser. No. 283,964, filed Aug. 28, 1972 now U.S. Pat. No. 3,917,648, that is a continuation-in-part of application Ser. No. 107,578 (now abandoned), filed Jan. 18, 1971, and the latter application is a continuation-in-part of application Ser. No. 75,306 (now abandoned), filed Sept. 24, 1970. Application Ser. No. 284,099, filed Aug. 28, 1972, is a continuation-in-part of applications Ser. Nos. 107,578 and 75,306. The disclosure in these patent applications is hereby incorporated by reference in this application.

This invention relates to self-curing coating compositions and particularly to novel coating compositions that can be applied to a ferrous surface to form a coating, i.e., film that provides exceptionally long-life protection from rusting of the ferrous surface. Some of these compositions contain a very low percentage of metallic zinc as zinc dust and these compositions provide on the ferrous surface a thin, highly protective cured film having a very low metallic zinc content. Other compositions have a higher zinc dust content and these can be used to provide a thinner film on the ferrous surface that imparts such protection. Still other compositions of the present invention contain zinc flake, as the metallic zinc of particulate form in the composition instead of zinc dust, and these compositions can be used to form on the ferrous surface a very thin film that provides this protection from rusting.

The coating composition of the present invention contains metallic zinc in particulate form, e.g., zinc dust or zinc flake; a polyol silicate; a chromate composition selected from strontium chromate, calcium chromate, barium chromate, lead chromate plus lead sulfate (chrome-yellow primrose) and a mixture of zinc chromate and zinc oxide or hydroxide; and a liquid organic vehicle. The polyol silicate in the coating composition is a solvent-soluble, polyol silicate ester-exchange reaction product of: (1) an organic silicate consisting essentially of ortho or poly silicates having ester-exchangeable groups of 1 to 6 carbon atoms selected from the group consisting of alkyl, hydroxyalkyl, alkoxyalkyl, and hydroxyalkoxyalkyl, siloxanes thereof, and their mixtures; and (2) a polyol which is ester-exchangeable with (1). The polyol used to make the reaction product is selected from the group consisting of an aliphatic polyol and a mixture of a major amount of said aliphatic polyol and a minor amount of a residual polyol such as polyvinyl butyral.

The coating composition of the invention contains, based on the composition without the liquid organic vehicle, between about 4% and about 95% by weight of said metallic zinc, between about 1% and about 80% by weight of said chromate composition, and between about 1.5% and about 70% by weight of said polyol silicate.

When the composition contains zinc dust as the metallic zinc ingredient, it is preferred that the zinc dust have an average particle size of less than 10 microns. Suitable zinc dust includes dust having an average particle size of 0.5 micron to 20 microns. It is especially preferred that the zinc dust have an average particle size between 2 and 5 microns. Of course, the zinc dust that is used conventionally has some zinc oxide on its surface. Relatively pure zinc dust is commercially available and it is preferred. Other zinc dusts that are available contain some copper, iron, lead or chromium and such zinc dust is less preferred because it does provide a coating, from the coating composition, that has less protective action. When the metallic zinc in the coating composition is zinc flake, it is preferred that it has a particle size of less than 325 mesh. The zinc flake is preferably a non-leafing type. It is flat and is made preferably by ball milling dust or powder of zinc or its alloy with metal higher than iron in the electromotive chemical series, such as aluminum and magnesium, in the presence of a lubricating and protective (against oxidation) solvent such as a higher boiling yet volatile aromatic solvent.

Strontium chromate and calcium chromate are preferred chromate compositions. In the coating compositions there may be present along with the chromate composition, other compounds of strontium, calcium and barium. These compounds include a carbonate, oxalate, silicate and oxide, for example, salts of calcium and barium. The composition can contain a small amount of chromic acid, added as aqueous chromic acid, and in that case the composition includes one of the chemical compounds of strontium, calcium and barium, e.g., their oxide or carbonate. Other chemical compounds of these metals that can be present when a small amount of chromic acid is used include barium, calcium and strontium carboxylates, such as succinate, as mixed chromate-carboxylate salts of these metals.

In the case of the chromate of strontium, calcium, lead, barium and zinc, these metal chromates are desirably used in the form of the commercially available finely-divided pigment grade. As mentioned above, the coating composition contains polyol silicate that is soluble in a solvent. Such polyol silicates are described in detail in my said patent applications mentioned above and incorporated herein by reference. Preferred polyol silicates for use in the coating compositions of the present invention are thus obtained by reacting polyol with ethyl silicate 40 (a commercial product having an average of about 5 SiO groups per molecule) or tetraethyl orthosilicate having a hydrolysis of less than 70% and preferably less than 45%. The polyol reacted with the organic silicate is an aliphatic polyol such as ethylene glycol, propylene glycol, and glycerol. The ratio of polyol to organic silicate to make the reaction product is between 0.7 and 1.9 moles of polyol to one SiO unit in the organic silicate. Another way of expressing this ratio is that based on moles of hydroxyl groups of the polyol reactant per mole of ester-exchangeable group of the organic silicate. In that case the range of these reactants is about 0.15 to about 1.8 moles of hydroxyl group in the polyol to one mole of monofunctional ester-exchangeable group of the organic silicate reactant.

When the polyol reactant is a mixture of a major amount of the aliphatic polyol and a minor amount of polyvinyl butyral the aliphatic polyol is preferably one of those mentioned above. Especially preferred is ethylene glycol as the aliphatic glycol and the preferred weight ratio of ethylene glycol to polyvinyl butyral is in the range of between about 2 and 5 to 1. Instead of polyvinyl butyral the polyol reactant can contain as a minor ingredient polyalkylene glycol, pentaerythritol or other residual polyol. The preferred range of polyvinyl butyral or other residual polyol in the cured dry coating is between about 1% and 12% by weight based on the film, i.e., residue after curing.

As mentioned above, the coating composition of the invention includes a liquid organic vehicle. This organic vehicle is a solvent for the polyol silicate. Suitable solvents include aromatic hydrocarbons, oxygen-containing organic solvents, and nitrogen-containing organic solvents, such as nitroparaffin solvents. These solvents have boiling points below about 200° F. These solvents are non-gelling and are of the paint solvent type. The liquid organic vehicle is present in the coating composition in an amount sufficient to provide a liquid, homogeneous coating composition that has a viscosity that is suitable for the use of the composition to provide a satisfactory coating film on a ferrous surface by conventional application techniques, such as by air spray, airless spray, and electrostatic spray or by dip, brush, roll or flow application. The nitroparaffin solvent may inhibit chromate degradation.

The coating composition of the present invention may include, in addition to the ingredients recited above, one or more of various additives known to those heretofore used in protective coating compositions. These include color pigments, reinforcing pigments and extenders, thixiotropic agents, antisag agents, such as pyrogenic silica (Carbosil), montmorillonite, and bentonite, and other cathodically active metals such as magnesium powder and aluminum powder. The preferred additional ingredient is Ferrophos, which is ferrous phosphide ($Fe_2P$). Ferrophos has an average particle size between 0.5 and 10 microns. It is preferred that the Ferrophos used in the composition of the present invention have an average particle size of less than 5 microns.

A zinc-rich paint of the prior art has been defined as a paint in which at least 85% of the total nonvolatile film portion is zinc dust. Many thousands of tons of zinc-rich paints of this type have been used each year on ferrous surfaces of bridges, autos, ships, off-shore installations, etc., i.e., on ferrous surfaces that will be exposed to corrosion. The primary theory for functioning of the organic bound zinc-rich paint has been that the zinc particles touch each other to have a substantially galvanic connection to the substrate surface, i.e., ferrous surface, and thereby allow the zinc to sacrifice itself to corrosion instead of the iron. In these organic-bound paints, often the zinc particles become surrounded by the organic binder and are insulated and lost from the coatings' galvanic protective action, and hence these types of zinc coatings are not as active or long-lived in protection against rusting at equal zinc contents and film thicknesses, when breaks occur in the film, as are the inorganic porous-type zinc coatings where all zinc is available for sacrifice.

There are three main types of inorganic zinc silicate coatings of the prior art that are described in U.S. Pat. Nos. 3,130,061, 3,320,082 and 3,056,648. These are the post (or self) cured lead-zinc silicate type, the self (or post) curing water-based silicate type, and the self curing ethyl silicate type. All of these semiporous types are virtually an electric cell of zinc-iron with moisture or salt water being the electrolyte, so that whenever moist corrosive conditions contact the coating the zinc sacrifices itself building up oxidation products to passivate the steel and to slow down the galvanic cell activity as the coating ages and by stifling electrolyte penetration. This type of coating needs to have the zinc particles close together, but it is not necessary to have them touching. In order to slow down the moisture penetration and high electrical degradation, due to the cell activity of this porous inorganic zinc coating, over ferrous surfaces, the thickness of the coating, for long life, must be over at least 2 and preferably about 4 mils. With such thickness of the coating electrolyte penetration is low and the zinc oxidation products are better locked in to passivate the steel surface so as to slow down cell activity. Once the zinc is used up the steel surface starts rusting. In the prior art many methods have been devised to improve the life of such coatings such as mixed lead-zinc silicates and phosphoric acid post-curing. Many proprietary formulations were devised comprising many neutral and platey fillers such as clays, talc, calcium carbonate, mica, etc. to help locking in the zinc and zinc oxidation products acting as passivators and to stifle electrolyte penetration into the zinc film to improve film rust-free life. Another recent improved technique has been to increase contact of the zinc and steel and at the same time passivate the ferrous substrate (and zinc) by using chrome compounds resulting from chromic acid and zinc as part of the film nearest the steel, however, these compositions while functioning very well to improve contact with and passivate the steel have been described in the patent literature to be heat cured at relatively high temperatures. They are not an easy-to-use single-package stable composition for easy application; rather, they have to be applied by industrial processes wherein the coating is applied to a specially-prepared substrate. The film is then heat cured and subsequently topcoated with a conventional zinc-rich paint. These compositions are described in U.S. Pat. No. 3,819,425 and German applications Nos. 2,352,143, 2,352,130, 2,352,104 and 2,352,150 as chromic acid-zinc, water-based compositions with multi-step heat-curing processes for their applications. Numerous other references on paints comprising corrosion (rust) inhibitive inorganic pigments with partially hydrolyzed silicates (see U.S. Pat. No. 2,450,327) in which hydrolyzed ethyl silicate, mica and a heat-resistant, corrosion-inhibitive inorganic pigment, such as strontium chromate, chrome green, zinc yellow, and barium chromate have been used.

U.S. Pat. Nos. 3,653,930 and 3,730,746 teach chromates but no definition is given of the chromate type. Many metal chromates have been tested in the development of the composition of the present invention. Only those mentioned above have been found to be satisfactory in coating compositions containing my novel polyol silicate and metallic zinc.

The coating composition of the invention may be as a single package containing all ingredients or as two packages. One package in the two-package product comprises the polyol silicate and the chromate composition homogeneously dispersed in the liquid organic vehicle and a mixture of the metallic zinc and Ferrophos as the second package. The $Fe_2P$ may be incorporated into either package. The two packages are mixed prior to the use as a paint. If zinc flake is used it is preferably a single package, but may be a two-package system with the polyol silicate binder and chromate inhibitor as one package and the zinc flake in aromatic solvent as the second package to be mixed prior to use. It is understood that conventional suspending agents, solvents, antisag agents and other common paint additives may be added to either package. The single package preferably contains more hydrocarbon solvent to prevent zinc reaction.

In one aspect of the invention the composition is made as a single package that is easily applied to provide air-cured or heat-cured coatings having physical characteristics ranging from those of inorganic ceramic types of film to flexible partly organic silicate films, while at the same time having the adhesion, toughness, and flexibility of excellent chemically-cured organic binders.

The self-curing coating compositions of the invention are direct substitutes for, but with improvements over, galvanized metal with the added advantage that the coating can be applied by dip, brush, roll, airless or air spray and at much thinner thicknesses than have been previously possible for adequate protection by using conventional known inorganic zinc, or zinc-rich coatings, and yet have highly unexpected long galvanic protection.

Heretofore zinc-rich paints had to be applied to ferrous articles to obtain a film or coating having a thickness of at least 1 mil, while inorganic zinc silicates had to be applied in amounts to form films for coatings of at least 1, preferably 2 to 4 mil to obtain good corrosion resistance in long salty exposure for coated ferrous surfaces. The thick coating caused pinholing and bubbling of topcoats and prevented coating of precision parts for which a thick coat often was uneven and the coating thickness adversely affected the dimensions of the precision parts. In addition, the articles to be coated were often of a shape that could not be sprayed and yet were too big to be easily galvanized. These articles required a thin even coating that had the protective life to galvanize. They required a very thin coating of only 0.05 to 0.2 mil that was easily and more accurately and evenly applied. An ordinary 0.2-mil scored coating from conventional zinc-rich paint lasted only a day in the salt fog. Inorganic zinc coatings, which are 0.1 to 0.2 mil thick, lasted only overnight in the salt fog. Thus there has been a real need for the composition of the present invention that can provide highly protective thin coatings.

Known processes using compositions of the prior art involve difficult-to-use techniques not at all applicable to the maintenance painter, ship or tank painter, who must rely on easy-to-use coating products which self-cure, which are ready to use right out of the can, and which do not require complicated multi-step processes having special curing techniques. It is therefore a primary object of this invention to provide compositions which have valuable chromate-steel surfaces contact and passivation effects and also have the valuable ease of use, by any painter in the field, by just opening the can or simply mixing a 2-package system and applying. Further those invention compositions are far more versatile and highly protective at thicknesses from 0.1 to 20 mil without mud-cracking, whereas conventional zinc silicates of the self-curing types have to be applied at less than 4–5 mils to limit mud-cracking and do not give adequate protection at a coating thickness of less than 1 mil. The pot life of conventional types of coating compositions is only a few hours, whereas compositions of the present invention have a pot life of months or years.

The compositions of the invention are particularly useful as zinc coatings that provide long-life galvanic protection against rust when cured on ferrous substrates—at very low metallic zinc content in a thin film or coating or at higher metallic zinc content in a very thin, cured film. In the former case, the composition is a less expensive paint. In the latter case, the composition can provide a very thin protective coating for high dimensional-tolerance steel shapes for which a thick coating is not suitable. The low-zinc coating compositions of the invention are especially useful since they can be diluted in zinc content by the incorporation of more weldable fillers, such as iron phosphide, or can be simply applied as thinner coatings that are more tolerant of either spot (resistance) welding or submerged-arc welding types, without burnback, with a minimum of problems due to increased porosity, volatilization of the zinc, and difficulty in striking of the weld. In the case of resistance welding the film from the composition provides improvements such as welds of higher shear strength, negligible electrode wear and nugget size after thousands of continuous welds, and less zinc fumes, simply because less zinc coating is necessary for protection against rust when using self-curing coating composition of the present invention.

The zinc-coating compositions of the invention cure rapidly enough to use as a preconstruction primer adhering to shot-blasted, cold-rolled or pickled steel plates, beams, etc. to provide antirust protection to the steel until used, and even thereafter in the erection of a boat, bridge, building, etc. The final steel construction can be repainted, without or at most a minimum of further surface treatment, using the coating composition of the present invention or using a conventional compatible zinc coating composition or an organic topcoat composition, such as epoxy polyamide, acrylic, acrylic-water-based, vinyl, polyester, epoxy powder coating compositions or using other compatible organic topcoat or porous inorganic topcoat comprising the polyol silicate of this invention, and other fillers and colored pigments.

The compositions of the present invention produce semi-flexible, adherent, zinc-containing, coil-coatings that are galvanically protective and will undergo conventional forming operations with a minimum of film breakage and adhesion loss and will adhere either to conventional steel, chrome-passivated steel, etched steel or to epoxy zinc coating over ferrous surfaces and said coatings of this invention will accept, without problems, conventional topcoats that are stated above.

The compositions of this invention that contain all four ingredients are provided as a single package. They provide a self-curing, long-life protective coating to ferrous substrates. Using a composition of polyol silicate, strontium chromate, and zinc flake, the coating with a thickness of 0.05 to 0.3 mil provides a highly superior rust-resistant coating that is easy to apply. It provides a coating that accepts topcoats without the pinholing or blistering that is a common problem of inorganic zinc silicate coatings.

It is not known what makes the coating perform so well in corrosive neutral moist and salty atmospheres for long periods of time—when the coating is so thin but films, as thin as 0.1 mil, perform quite well for years outside and a 0.2-mil coat will survive over 2,000 hours in the ASTM B117 salt fog test with no rusting.

The aspect of the composition of the invention, containing zinc flake as the metallic zinc in particulate form, is particularly useful as a thin weld-thru preconstruction primer, since the coating is so thin there is no hold-up in continuous arc welding and there is produced greatly reduced zinc fumes. In spot (resistance) welding these extremely thin coatings exhibit no burnback from the weld and provide welds with higher shear strength, neglibible electrode wear and nugget size after thousands of continuous welds with less zinc fumes and less weld porosity, simply because the welding is through a thinner zinc coating. Another advantage is that the zinc flake pigment does not settle out hard in the polyol silicate and as a single package allows marketing very inexpensively a direct galvanizing substitute for the ship construction yard, the marine and maintenance painting contractor and even the home handyman, the small precision steel parts producer, and the maintenance touch painter. The coating applies so evenly there is no need for concern about excessive thickness. The films properly prepared and applied, as thin as 0.05 to 0.2-mil dry film thickness, are protective for years outside and at 0.2-mil thickness are protective for 2,000 hours in the ASTM B117 salt fog accelerated corrosion rust test without rusting or rust undercutting. The coating from the composition containing polyol silicate and zinc flake is silvery and looks like galvanized coating and hence is an attractive coating for wherever a galvanized coating is now being used. The coating can be applied at temperatures ranging from 0° to 120° F.

Organic modifying additives such as polyvinyl butyral, other residual polyols or similar materials can be used along with or reacted with the polyol silicates. Of course, at least 1.5% by weight (as defined earlier) of chromate composition, preferably strontium chromate is present in the coating composition. The ratio of silica, deposited by the polyol silicate in the cured film to zinc flake can be much higher (up to 50%) as compared to 1 to about 15% for conventional alkyl silicate zinc dust paints.

The following illustratively describes, as examples A and B, the preparation of polyol silicate used in the coating composition of the present invention.

In a glass-lined reactor (75-gallon capacity) a mixture of 168.36 lbs. of ethylene glycol and 226.4 lbs. of ethyl silicate 40, 5.61 lbs. of 2-ethoxy-ethanol and 40 ml. of 20% aqueous sulfuric acid was heated to 105° C. when refluxing commenced. After reacting 20 minutes, the mixture was cooled to 80° F. and 10 lbs. methanol was added to provide polyol silicate A that had a gravity of 1.048 at 32.5° C. and a yellow color. It was a clear liquid containing 22.4% silica as $SiO_2$.

A mixture of 172.4 lbs. of condensed ethyl silicate, containing 95% monomer and 5% dimer and having a silica ($SiO_2$) content of 28.4% by weight, and 87.9 lbs. of ethylene glycol was heated to reflux (95° C) in the presence of 8 ml. of 20% aqueous sulfuric acid in the glass-lined reactor (mentioned above). After refluxing, the mix was cooled to 90° C. and then 110 lbs. of toluene and 14.1 lbs. of methanol are added, followed by the addition of 19 lbs. of polyvinyl butyral while stirring. (The polyvinyl butyral had a hydroxyl content expressed as polyvinyl alcohol of 9 to 13%, and an average molecular wt. of 36,000, and was known as Butvar B 79 made by Monsanto Chemical Co.). The reactants were again heated to 80° C. and cooled to provide polyol silicate B.

These polyol silicates are used in the following examples of the coating composition of the present invention.

EXAMPLE 1

One hundred wt. parts of polyol silicate B, 4 wt. parts of strontium chromate (jet milled), 50 wt. parts of zinc flake (minus 325 mesh and made by ball milling zinc dust in aromatic solvent dispersion), 100 wt. parts of toluene and 5 wt. parts of mixed nitropropane solvent were mixed, in a blender (high shear) or paint mill, to form a coating composition.

Dicarboxylic Acids, such as succinic in small amounts 0.02 wt. parts) may be added to accelerate the cure rate of a coating obtained from the coating composition but its presence in the composition causes a light gassing after several days of storage of the composition in a can. By adding a small amount of aluminum hydrate to absorb and render insoluble the succinic acid the gassing is stopped.

This coating composition was stable for several months without hard settling yet gave a good hard adhesive coating which had exceptional life in the ASTM B117 salt fog test even at a 0.2-mil, dry-film thickness and provided excellent weld-thru properties. In addition, exposure (south with tipping at a 45° angle) to atmospheric conditions (the Adrian, Michigan, atmosphere) for 10 months produced no rusting of any kind to a 0.1-mil dry film on scored, cold-rolled clean steel.

EXAMPLE 2

The polyol silicate A, which leaves no residue other than silica, since it had no residual polyol such as polyvinyl butyral in it, was used to make a composition otherwise the same A as Example 1. The salt fog test of this composition showed the desirability of using the residual polyol in the preparation of the polyol silicate.

It was found that the more polyvinyl butyral in the polyol silicate the better the salt fog antirusting characteristics (with relatively high strontium chromate content) of the zinc flake coating composition. This shows the value of the residual polyol; however, it was noted that if the residual polyol content (polyvinyl butyral content) of the dry-cured film was much greater than about 7% (e.g., 20%) the chemical and solvent insolubility resistance was greatly impaired. This was because such coating was soluble in certain solvents. At lower ratios the coating was insoluble. While the insolubility of the coating is important in some applications, it is unimportant in others, thus the range of residual polyol can be adjusted to fit the needs of the final use of the coatings.

It was found that zinc chromate was not nearly as effective as strontium chromate in the coating composition of the invention. A coating composition using basic zinc chromate was substantially poorer in preventing rust than a comparable coating composition without any chromate composition.

In the absence of strontium chromate or other chromate composition in the coating composition, a thin film in the ASTM B117 salt fog test starts rusting in 1 or 2 days but with only a 0.2-mil thickness of the coating composition containing strontium chromate there was no rusting after several months.

EXAMPLE 3

Using polyol silicate B, a series of coating compositions were prepared identical to Example 1, except that 6, 8, 10, 12, 15, 20 and 40 wt. parts of strontium chromate were used instead of the 4 wt. parts used in Example 1. The compositions provided coatings with excellent rust prevention, particularly as thin films for which the higher chromate content is preferred. In another series the zinc flake content was doubled with excellent results. Much less zinc flake is necessary than similar coatings using zinc dust. If the strontium chromate was left out of the coating composition, rusting occurred rapidly in ASTM B117 salt fog test; the coating failed in as little as 2 days when it was 0.05 to 0.1-mil dry film thickness on clean cold rolled steel. The composition, as a coating of such thickness, protected for more than 2 months if the strontium chromate was present.

Coatings of compositions of this invention prepared with zinc flake were directly compared with those made with zinc dust. Such coating on steel panels were exposed to the atmospheric and to the ASTM B117 salt fog exposure test. It was found that on a thickness basis zinc flake is about 3 times as protective as zinc dust. Coating compositions with zinc flake or zinc dust do not perform well as thin coatings unless the chromate composition is also present. Zinc flake films are highly protective down to 0.05 to 0.2-mil thickness whereas the zinc dust films need to be about 0.4-mil thickness to be as protective. Zinc flake films are less flexible and hence will not undergo forming as well as zinc dust coatings at the same thicknesses. Zinc flake gives superior coverage and works best at low levels (i.e., 1–5 lbs. of zinc/gal. of paint, i.e., of coating composition), whereas zinc dust is desirably present in a content of at least 3 lbs./gal. and appears to work much better when an inert extending filler, such as iron phosphide, is also present in the film.

It is not clearly understood how these three ingredients of my coating composition cooperate to make such a highly protective coating, even as a very thin coat. It is thought that the strontium chromate or other chromate composition in the presence of metallic zinc and my polyol silicate, functions in a dual role—that of creating a cell that has excellent electrical contact with the steel surface to sacrifice the zinc as necessary, to protect the steel from rusting, and even more important to passivate the steel (or other ferrous) surface so that the electrical flow is just sufficient to protect the steel surface so that the coating functions much longer than conventional coatings.

The coatings of this invention can be applied over clean steel, cold rolled steel, etched steel, pickled steel, chromic zinc passivated steel, sand shot or water blasted steel, over or under inorganic chromate inhibitive compositions containing polyol silicate without metallic zinc, or over coatings from solutions of chromic acid in collodial silica solutions containing strontium or calcium carbonate, oxalate or oxide. The coating compositions of the invention are particularly useful to retard rusting by a touch-up painting of old zinc-coated surfaces, and by painting over inhibited surfaces after blasting.

EXAMPLE 4

To show the effect of various contents of strontium chromate in the coating compositions of this invention as cured films, coating compositions were made in which the metallic zinc content and the content of the other ingredients (except strontium chromate) of the composition, to form a cured dry film, were kept constant. Each composition, being a single-package paint, was made by high shearing into 200 wt. parts of the polyol silicate B in the following order: 400 wt. parts of iron phosphide (average particle size of 2–3 microns); 50 wt. parts of zinc oxide (fine pigment grade); 5 wt. parts of finely divided (1 micron) platey talc; 200 wt. parts of zinc dust (average particle size of 3 microns); and 100 wt. parts of dry toluene. Eight compositions were prepared. Strontium chromate was not added to the first composition. It was added in the amount of 1, 5, 10, 20, 40, 80, and 160 wt. parts to the second through eighth compositions. It was noted that all were paintable except the eighth composition to which was added 160 wt. parts of strontium chromate. That composition was too thick to paint.

The first through eighth compositions as cured dry films contained, calculated from the coating compositions, on a weight percent basis: zinc dust in the amount of 29, 29, 28.8, 28.6, 28.2, 27.4, 26.0 and 23.6, respectively; zinc oxide in the amount of 7.3, 7.2, 7.2, 7.2, 7.0, 6.8, 6.5 and 5.9, respectively; strontium chromate in the amount of 0, 0.14, 0.7, 1.4, 2.8, 5.5, 10.4, and 18.8, respectively; calculated $SiO_2$ (from polyol silicate) in the amount of 3.5, 3.5, 3.5, 3.4, 3.4, 3.3, 3.1 and 2.8, respectively; polyvinyl butyral in the amount of 1.4, 1.4, 1.4, 1.4, 1.4, 1.4, 1.3 and 1.2, respectively; talc in the amount of 0.7 down to 0.6; and Ferrophos in the amount of 58.1, 58.0, 57.6, 57.6, 57.2, 56.4, 52, and 47.1, respectively.

The first 7 of these 8 compositions were used to provide a scored film of 0.8-mil thickness on clean 22-gage steel panel. These panels were subjected to the ASTM B117 salt fog test until rust appeared. These coated panels of the first 7 compositions started to rust at 24, 36, 144, 990, 2,100, 3,100 and 4,200 hours, respectively.

Some of these compositions appear to age after a substantial storage time. As a result, for certain compositions of the present invention it is desirable to furnish the composition to the user in the form of a two-package system mentioned earlier. In that case, for the foregoing compositions of this example the zinc dust is in one package and it is added to the rest of the composition, furnished as a second package, just prior to use. This prevents excess passivation of the metal zinc dust.

In a similar series of formulations the zinc dust content was decreased to 14%, keeping the other ingredients in the same relative proportions, with salt fog test results similar—when the coating thickness was 1 mil. At lower amounts of zinc dust than 10% in the cured film the results were less desirable. At higher levels of zinc dust in the cured film (46%), a 1-mil film on a cold-rolled clean (not blasted) steel panel was still rust-free after 6,000 hours. A 0.5-mil film (with 10.4% strontium chromate) lasted over 3,000 hours with no rusting even in the scored areas. At a film thickness of less than 0.5 mil, the salt fog protection was less effective. Outdoor exposure of a 0.7-mil film for a period of one year showed no rusting, even in the scored areas. It was also noted that the position of the panel in the salt fog tester had no effect on the performance that was equivalent whether it was vertical, or horizontal, or at an angle throughout its surface. Ordinary inorganic zinc films on the other hand change drastically with position in the salt fog apparatus (upper and lower surfaces).

It was noted that at the higher level of strontium chromate (10.4%) very thick (6–12-mil) coatings did not mudcrack. They were not nearly as hard as the thinner coatings or those coatings having lower amounts of the strontium chromate and, therefore, had poorer abrasion resistance. It was concluded that, if thick coatings are applied, a lower content of strontium chromate would preferably be used (about 1.5–3% by weight based on the cured dry film), whereas, for very thin coatings (e.g., 0.5-mil thickness) a higher strontium chromate content is preferred as better performance is obtained and the hardness is not reduced.

It was further found in similar experiments that the talc was not necessary or advisable in some formulations. Zinc oxide had an improving effect on performance when zinc chromate was used as the chromate composition, and in that case a substantial amount of zinc oxide was required to obtain a long period of protection in the salt fog exposure.

The polyvinyl butyral, as an illustrative residual polyol, had a definite promoting effect on the corrosion inhibiting effect, actually extending the period of time before rusting started.

The following example illustrates the rust protection provided by the compositions of the invention containing zinc chromate and zinc oxide as the chromate composition. The illustrative composition is compared with a composition that is identical in weight percent of ingredients except that it does not contain any zinc chromate. The composition is also compared with one in which the ingredients are the same except to contain basic zinc chromate instead of zinc chromate.

EXAMPLE 5

Three coating compositions were prepared for comparison. Each contained 200 wt. parts of zinc oxide, 400 wt. parts of polyol silicate B, 100 wt. parts of zinc dust (3 micron average particle size and containing 5% zinc oxide), 600 wt. parts of Ferrophos (2–3 micron particle size), and 200 wt. parts of dry toluene. In addition, the second composition contained 40 wt. parts of basic zinc chromate while the third composition contained, instead of basic zinc chromate, 40 wt. parts of zinc chromate (yellow).

These three compositions were used to provide 1.8-mil scored films on steel that was then subjected to the ASTM salt fog test mentioned above. The first rust was noticed after 24 hours when using the films obtained from the first and second compositions, whereas, the first rust was noticed only after 2,000 hours when using the film from the third composition, namely, that composition containing zinc chromate. The cured films from these three compositions contained, on a calculated weight basis, about 20% zinc oxide, about 5% $SiO_2$ (from polyol silicate B), about 2% polyvinyl butyral (also from polyol silicate B), about 50% Ferrophos, and about 10% zinc dust. The second and third compositions contained about 4% basic zinc chromate and zinc chromate, respectively.

I find it preferable to keep the content of amorphous silica deposited from the polyol silicate at 0.5 and 12% of the cured film. A higher content of polyol silicate is preferably used when zinc flake is used as the metallic zinc.

The polyvinyl butyral residue content of the film is preferably over 1% and increases in performance up to 8%. Without either the functional polymeric material or zinc oxide in the cured film, the inhibiting effect of the zinc chromate composition drops off far more rapidly in severe exposure such as in the ASTM B117 salt fog test.

The metallic zinc content is not limited to low values when used with polyol silicate and chromate composition. The higher the metallic zinc content, up to about 90%, the better the performance, particularly in very thin films or for those coatings where exceptional long life is desired. For instance a composition containing 91% by weight (in a 4-mil dry-cured coating) of zinc and 4% by weight of strontium chromate gave a coating which lasted without rusting for over 2 years in the ASTM B117 salt fog test. As a 0.5-mil coating it was at least 5 times as effective when strontium chromate is present than the composition without it. These compositions with strontium chromate are exceptionally protective against rusting even at low film thickness levels.

The foregoing description has been presented solely for the purpose of illustration and not by way of limitation of the invention because the latter is limited only by the claims that follow.

I claim:
1. A coating composition comprising:
    metallic zinc in particulate form;
    a chromate composition selected from strontium chromate, calcium chromate, barium chromate lead chromate plus lead sulfate and a mixture of zinc chromate and zinc oxide or zinc hydroxide;
    a polyol silicate; and
    a liquid organic vehicle,
said coating composition containing between about 4% and about 95% by weight of said metallic zinc, between about 1% and about 80% by weight of said chromate composition, and between about 1.5% and about 70% by weight of said polyol silicate, said weight percentages being based on the coating composition without said liquid organic vehicle,
said polyol silicate being a solvent-soluble, polyol silicate ester-exchange reaction product of:
    (1) an organic silicate consisting essentially of ortho or poly silicates having ester-exchangeable groups of 1 to 6 carbon atoms selected from the group consisting of alkyl, hydroxyalkyl, alkoxyalkyl, and hydroxyalkoxyalkyl, siloxanes thereof, and their mixtures; and
    (2) a polyol which is ester-exchangeable with (1),
said polyol being selected from the group consisting of an aliphatic polyol and a mixture of a major amount of said aliphatic polyol and a minor amount of polyvinyl butyral, and
said polyol silicate reaction product being made by reacting (1) and (2) in amounts providing a ratio of about 0.15 to about 1.8 moles of hydroxyl groups of (2) per mole of ester-exchangeable group of (1).

2. The coating composition of claim 1 and further containing finely divided iron phosphide in an amount of about 1 and about 70% by weight as based on the coating composition without said organic vehicle.

3. The coating composition of claim 2 wherein said iron phosphide has an average particle size of less than 5 microns.

4. The coating composition of claim 1 wherein said metallic zinc in particulate form is zinc dust having an average particle size of less than 10 microns.

5. The coating composition of claim 4 and further including finely divided iron phosphide in an amount of about 1 and about 70% by weight as based on the composition without said organic vehicle.

6. The coating composition of claim 5 wherein said iron phosphide has an average particle size of less than 5 microns.

7. The coating composition of claim 1 wherein said polyol used to make said polyol silicate is said mixture of aliphatic polyol and polyvinyl butyral.

8. The coating composition of claim 7 wherein the aliphatic polyol of said mixture of aliphatic polyol and polyvinyl butyral is ethylene glycol and the weight ratio of ethylene glycol to polyvinyl butyral is in the range of between about 2 and about 5 to 1.

9. The coating composition of claim 7 and further containing finely divided iron phosphide in an amount of about 1 to about 70% by weight based on the composition without said organic vehicle.

10. The coating composition of claim 9 wherein said iron phosphide has an average particle size of less than 5 microns.

11. The coating composition of claim 10 wherein the aliphatic polyol of said mixture of aliphatic polyol and polyvinyl butyral is ethylene glycol and the weight of ethylene glycol to polyvinyl butyral is in the range of between about 2 to about 5 to 1.

12. The coating composition of claim 11 wherein said metallic zinc in particulate form is zinc dust having an average particle size of less than 10 microns.

13. The coating composition of claim 1 wherein said metallic zinc is zinc flake of particle size less than 325 mesh.

14. The coating composition of claim 13 wherein said polyol used to make said polyol silicate is said mixture of aliphatic polyol and polyvinyl butyral.

15. The coating composition of claim 1 and further containing from about 5 to about 40% strontium carbonate by weight as based on said coating composition without said organic vehicle.

16. The coating composition of claim 15 and further containing from about 2 to about 5% by weight of chromic acid reacted therein, said percentage being based on said coating composition without said organic vehicle.

* * * * *

UNITED STATES PATENT AND TRADEMARK OFFICE
CERTIFICATE OF CORRECTION

PATENT NO. : 4,086,095

DATED : April 25, 1978

INVENTOR(S) : GORDON D. McLEOD

It is certified that error appears in the above-identified patent and that said Letters Patent are hereby corrected as shown below:

The name of the assignee should read "Mobil Oil Corporation".
Under the heading Related U.S. Application Data, the first line should read -- Continuation-in-part of Ser. No. 409,067, and --.
In the Abstract, lines 10 and 11, cancel "lead chromate plus lead sulfate (chrome yellow & primrose)".
Column 1, lines 39 to 40, delete "lead chromate plus lead sulfate (chrome-yellow primrose)".
Column 2, line 17, change "calcium" to -- zinc --; line 34, cancel "lead".
Column 3, lines 18 to 19, cancel "The nitroparaffin solvent may inhibit chromate degradation.".
Column 4, lines 57 to 58, cancel "The $Fe_2P$ may be incorporated into either package."; lines 62 to 63, cancel "in aromatic solvent"; lines 66 to 68, cancel "The single package preferably contains more hydrocarbon solvent to prevent zinc reaction."
Column 5, lines 49 to 50, cancel "contact and".
Column 8, line 3, change "Dicarboxylic Acids, such as succinic" to -- Acids, such as benzoic, --; line 4, change "0.02" to -- 0.1 --; line 9, change "succinic" to -- benzoic --.
Column 10, line 68, insert -- particularly -- before "when".
Column 11, line 34, change "2,000" to -- 3,000 --.

UNITED STATES PATENT OFFICE
CERTIFICATE OF CORRECTION

Patent No. 4,086,095  Dated April 25, 1978

Inventor(s) Gordon D. McLeod

It is certified that error appears in the above-identified patent and that said Letters Patent are hereby corrected as shown below:

Column 12, line 13, cancel "lead chromate plus lead sulfate".

Signed and Sealed this

Sixth Day of March 1979

[SEAL]

Attest:

RUTH C. MASON
*Attesting Officer*

DONALD W. BANNER
*Commissioner of Patents and Trademarks*